W. SCRIMGEOUR.
LINK WELDING DIES.
APPLICATION FILED DEC. 27, 1910.

1,008,371.

Patented Nov. 14, 1911.

WITNESSES
C. N. Walker.
J. T. Walker.

INVENTOR
William Scrimgeour
by Byrnes Townsend Brickenstein
Attorneys

UNITED STATES PATENT OFFICE.

WILLIAM SCRIMGEOUR, OF PORTSMOUTH, VIRGINIA.

LINK-WELDING DIES.

1,008,371.  Specification of Letters Patent.  Patented Nov. 14, 1911.

Application filed December 27, 1910. Serial No. 599,281.

*To all whom it may concern:*

Be it known that I, WILLIAM SCRIMGEOUR, a citizen of the United States, residing at Portsmouth, in the county of Norfolk and State of Virginia, have invented certain new and useful Improvements in Link-Welding Dies, of which the following is a specification.

My invention relates to dies for welding chain links.

In the method of welding chain links as usually heretofore practiced, the weld has been made at one end of the link by coöperating dies with the result that on the inner side of the curved end, there is liable to be left some projections or irregularities. These projections or irregularities are liable to cause the adjoining links of the chain to wear grooves or seats for themselves which may not be in line with the axis of the chain, with the result that the links tend to be diverted from a straight line and thus have brought upon them, when under tension, unnecessary strains.

It is the object of my invention to so form the weld that no irregularities are formed on the inner bearing surface of the chain links. This object I effect by providing a smooth, unbroken, continuous inner surface against which the weld is made.

Figure 1:
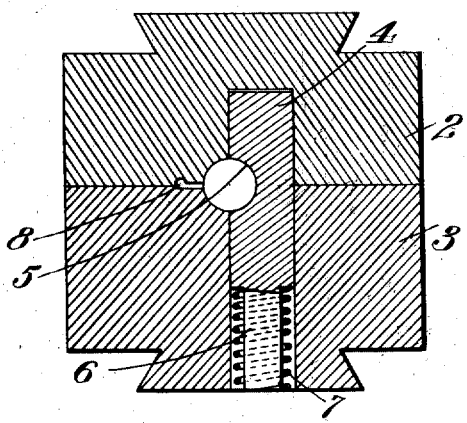
Figure 2:
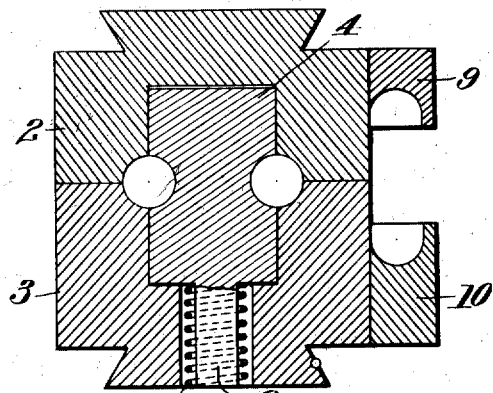
Figure 3:
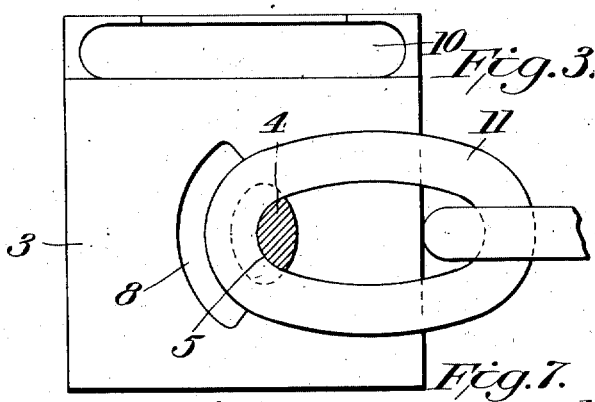
Figure 4:
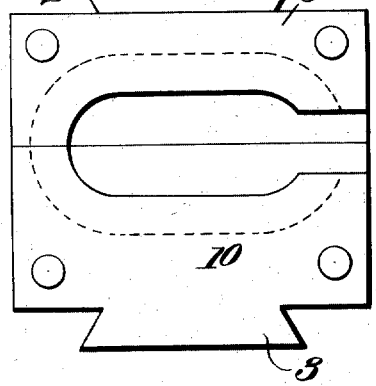
Figure 5:
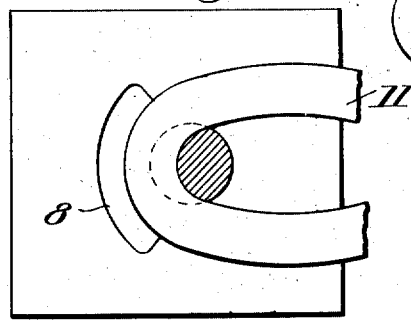
Figure 6:
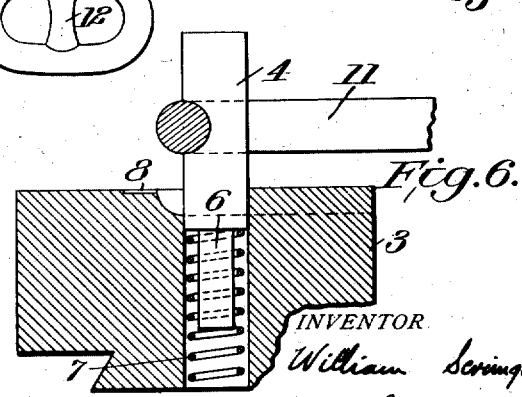

In the drawings—Figure 1 is a sectional elevation through the dies provided with a welding pin or mandrel. Fig. 2 is a sectional view at right angles to the plane of Fig. 1. Fig. 3 is a plan view of the lower die block, the link of the chain being shown resting thereon. Fig. 4 is a side view of the die blocks looking toward the left in Fig. 2. Fig. 5 is a plan view of the die block showing a modified form of welding pin or mandrel. Fig. 6 is a detail view showing the welding pin or mandrel in its raised position. Fig. 7 is a view of a finished link.

Referring to Fig. 1 of the drawings, 2 is the upper die block and 3 the lower die block, which may be respectively attached to a hammer and to an anvil in the usual form of apparatus used for drop forging. 4 is a welding pin or mandrel which is located within properly shaped cavities in the upper and lower dies. This pin or mandrel 4 is, in the construction shown in Figs. 1, 2 and 3, oval in cross section and is provided with a groove 5 which extends, as shown in Fig. 3, partly around its periphery. This pin 4 has at its lower end an extension 6 of smaller diameter which is surrounded by a coiled spring 7. The upper and lower dies are provided, as shown in Figs. 1 and 3, with co-acting depressions so as to form a flash chamber 8 into which any surplus metal is extruded.

Mounted on the sides of the die blocks 2 and 3 are coöperating shaping dies 9 and 10 having grooves formed therein as shown in Figs. 2 and 4, which are of such contour that when the welded link is placed therein it is brought to the desired shape. These shaping dies 9 and 10 also serve for putting into position the struts 12.

In Fig. 5 is shown a modified form of pin or mandrel in which the cross section is circular instead of oval, as in the other figures.

In operation, the heated link 11, to be welded, is put over the pin 4 with the ends to be welded in the groove of the pin, this pin being then in its raised position. If the form of pin shown in Figs. 1, 2 and 3 is used, the link must first be put over the top of the pin with the axes of the link and the pin in the same line and then turned at right angles to bring it into the position shown in Fig. 3. If the form of pin shown in Fig. 5 is used, the link can be placed directly over the top of the pin and its ends brought into proper position in the groove of the pin. When the upper die descends the pin 4 is forced downwardly against the spring pressure until it assumes the position shown in Fig. 1, the ends of the link blank being thereby forcibly brought together and welded, any surplus metal being extruded into the flash chamber 8. It will be noted that the inner surface of the link is shaped against the smooth inner surface of the groove in the pin so that a correspondingly smooth uninterrupted surface is produced on the inner surface of the corresponding portion of the link. When the weld has been effected the upper die is raised and the link can then be removed from the pin. The usual strut 12 is then inserted between the sides of the link, and the link then compressed between the dies 9 and 10 in order to bring it to the finished shape and to bend the sides into engagement with the ends of the strut.

I claim:

1. In a device for welding links, the combination with upper and lower dies each having recesses to receive the end portion of a link to be welded, of a movable pin or mandrel arranged in suitable cavities in the dies, said pin having a groove with an unbroken inner surface between which and coöperating surfaces on the dies, the weld is made.

2. In a device for welding links, the combination with upper and lower dies each having recesses to receive the end portion of a link to be welded, of a movable pin or mandrel arranged in suitable cavities in the dies, said pin having a groove with an unbroken inner surface between which and coöperating surfaces on the dies, the weld is made, and a compression spring arranged beneath said pin.

In testimony whereof, I affix my signature in presence of two witnesses.

WILLIAM SCRIMGEOUR.

Witnesses:
R. M. WILKINSON,
G. FRANK BEACH.

Copies of this patent may be obtained for five cents each, by addressing the "Commissioner of Patents, Washington, D. C."